Figure 7:
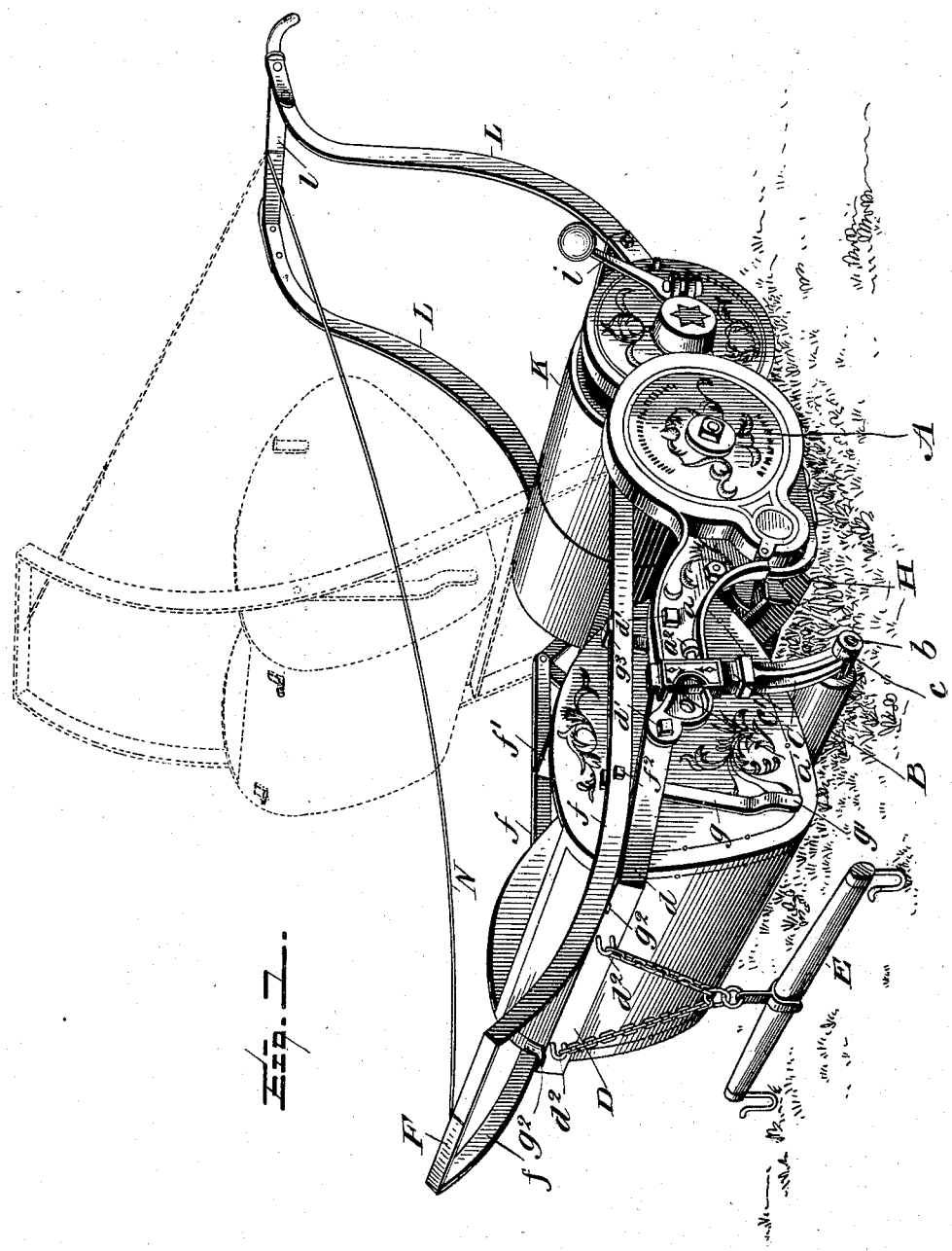

No. 640,995. Patented Jan. 9, 1900.
T. COLDWELL.
LAWN MOWER.
(Application filed Sept. 19, 1899.)
(No Model.) 2 Sheets—Sheet 1.

Witnesses:
L. C. Hills

Inventor
Thomas Coldwell
By Whitaker & Prevost Attorneys

No. 640,995.  
T. COLDWELL.  
LAWN MOWER.  
(Application filed Sept. 19, 1899.)  
Patented Jan. 9, 1900.
(No Model.)  
2 Sheets—Sheet 2.
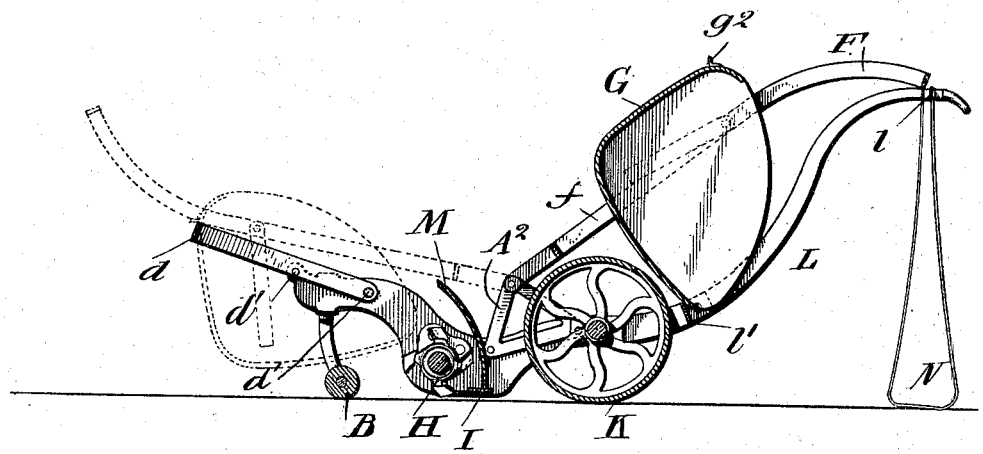
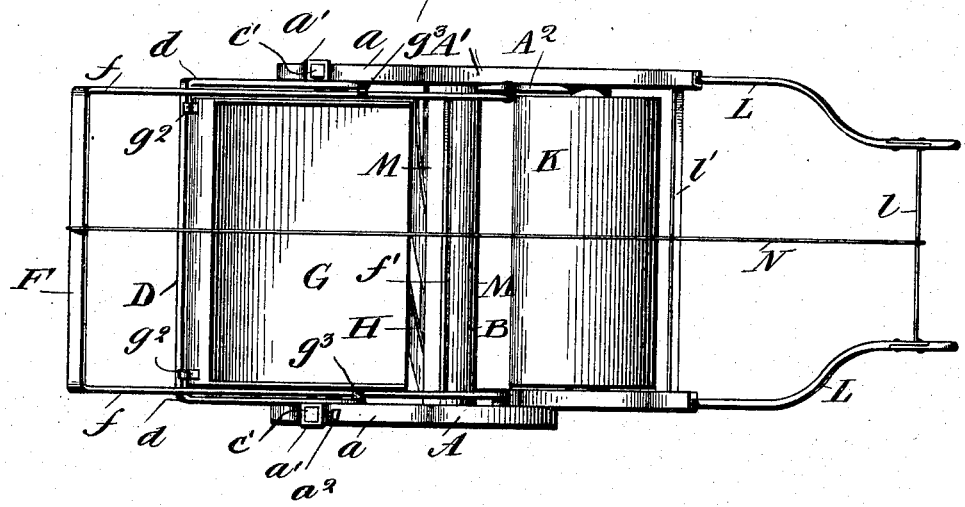
Witnesses  
Inventor  
Thomas Coldwell  
By Whitaker & Prevost Attorneys

UNITED STATES PATENT OFFICE.

THOMAS COLDWELL, OF NEWBURG, NEW YORK.

LAWN-MOWER.

SPECIFICATION forming part of Letters Patent No. 640,995, dated January 9, 1900.

Application filed September 19, 1899. Serial No. 730,972. (No model.)

*To all whom it may concern:*

Be it known that I, THOMAS COLDWELL, a citizen of the United States, residing at Newburg, in the county of Orange and State of New York, have invented certain new and useful Improvements in Lawn-Mowers; and I do hereby declare the following to be a full, clear, and exact description of the invention, such as will enable others skilled in the art to which it appertains to make and use the same.

My invention is an improvement in lawn-mowers; and it consists in the novel features hereinafter described, reference being had to the accompanying drawings, which illustrate one form in which I have contemplated embodying my invention, and said invention is fully disclosed in the following description and claims.

Referring to the said drawings, Figure 1 is a perspective view of a horse lawn-mower, showing my invention applied thereto. Fig. 2 is a longitudinal vertical sectional view of a mower, showing the grass-box in position to dump the grass in rear of the machine. Fig. 3 is a top plan view of the mower, showing the grass-box in its forward position ready to receive the cut grass.

The object of my invention is to provide a dumping grass-box for a lawn-mower which can be attached to the mower without changing the side frames thereof, the said grass-box being so constructed and supported that it can be swung entirely over the length of the machine proper and made to dump the cut grass in rear of the machine.

In the accompanying drawings I have shown my invention applied to a horse lawn-mower of the style known in the trade as "Coldwell's horse lawn-mower," and I shall proceed to describe my invention with reference thereto, it being apparent, however, that my improved grass-box could be attached to other lawn-mowers than horse lawn-mowers and to other styles of mowers than the one illustrated by making slight variations in the details of the apparatus without departing from my invention.

In the drawings, A A' represent the side frames of the mower, each of which is provided with a forwardly-extending portion $a$, provided with a vertical socket $a'$. The forward ends of the extensions $a$ are normally provided with transversely-extending devices, (not shown,) to which the draft devices are ordinarily attached and which are removed for the purpose of allowing my improved devices to be attached to the mower. The front portion of the mower-frame is supported at the desired distance above the ground by means of a roller B, (see Figs. 1 and 2,) the shaft $b$ of which is mounted in bearings $c$, carried at the lower ends of vertically-disposed supporting-arms C, the upper portions $c'$ of which are made rectangular in cross-section and fit within the sockets $a'$ of the side frames and are secured by set-screws $a^2$, extending through the side walls of each socket, so that the front portion of the lawn-mower frame can be adjusted vertically to regulate the height of the cutting apparatus above the ground, as will be readily understood.

D represents an extension-frame which is preferably formed from a single bar of iron or steel having a central portion extending transversely of the machine and rearwardly-extending arms $d$, which are bolted to the forward extensions $a$ of the side frames by means of bolts $d'$. The extension-frame D is preferably provided with draft hooks or staples $d^2$ $d^2$, to which the whiffletree E is attached.

F represents a pivoted bail, the side arms $f\,f$ of which are pivoted to the mower-frame. In this instance I have shown one of the arms $f$ pivoted to the side frame A on its inner face, and the opposite side frame A' is provided with a triangular bracket A$^2$, bolted to the said side frames, and the other arm $f$ is pivoted to said bracket at a point in line with the pivotal connection of the bail to the side frame A. In order to strengthen the bail, the arms $f\,f$ are connected adjacent to their points of pivoting by a cross-bar $f'$.

G represents the grass-box, which is preferably substantially triangular in cross-section and is open on one side. The said grass-box is pivotally connected to the bail F by means of bolts or screws $f^2$, which engage the grass-box above its center of gravity, so that as the bail is raised from its forward position the grass-box will swing on its pivotal connection with the bail and remain in a horizontal position. The grass-box G is formed of sheet metal, wood, or other suitable material, and I prefer to provide it at each end with a plate $g$, the upper ends of which receive the pivot bolts or screws $f^2 f^2$. The lower end of each of the plates $g$ is provided with an outwardly-extending portion or lug $g'$, which forms a stop which engages the lower side of the bail-arm $f$ when the bail has been moved past a vertical position, so as to arrest the swinging movement of the grass-box upon its pivot, when the further movement rearward of the bail will cause the dumping of the grass-box, as clearly shown in full lines in Fig. 2. The grass-box G is also provided on the upper portion of its front face with lugs $g^2 g^2$, which rest upon the front portion of the extension-frame D when the grass-box is in its forward position, and the rear portion of each end of the grass-box is also provided with a supporting-lug $g^3$, which engages the upper edge of one of the arms $f$ of the bail when the grass-box is in its forward position. The bail F is supported in its forward position by resting upon the extension-frame D, as shown in Figs. 1 and 3, and it will thus be seen that when the parts are in this position the grass-box will be supported by the pivots $f^2 f^2$ and the lugs $g^2 g^2$ and $g^3 g^3$, so that it will be held very firmly in position.

H represents the rotary cutter of the lawn-mower, which may be of any preferred construction.

I represents the stationary knife, K the driving-roller, which communicates motion to the revolving cutter in the usual manner, and L L represent the handles, secured to the side frames and connected by cross-bars $l\ l'$.

M represents a metal shield which is secured in rear of the rotary cutter and is so constructed as to throw the cut grass forward over the rotary cutter into the grass-box G.

For convenience in operating the bail F a cord, chain, or other flexible connection N is connected to the front portion of the bail at one end and to the cross-bar $l$ of the handle, so that the operator can throw the bail from its forward to its rearward position, and thereby empty the grass-box.

By mounting the grass-box pivotally in the bail it will be observed that the said box will maintain its normal horizontal position until after the bail has been moved to a substantially vertical position, so that the grass will not be dumped upon the machine itself, but will be deposited in rear of the roller K, as clearly shown in Fig. 2. It will also be seen that the lawn-mower can be used without the grass-box and that the grass-box can be attached thereto without requiring new side frames by using the extension-frame D and securing it to the front portions of the ordinary side frames. The ordinary horse lawn-mower is provided usually with a driver's seat and foot-rest, (not shown in the accompanying drawings,) which would of course have to be removed to apply my improved grass-box to the machine. I have not shown nor described particularly and in detail the construction of the horse lawn-mower referred to as the "Coldwell horse lawn-mower," as the particular construction thereof does not form any part of my present invention, and it is believed that a further description is unnecessary, the construction and operation of my improved device being clear from the foregoing description and the accompanying drawings.

What I claim, and desire to secure by Letters Patent, is—

1. The combination with a lawn-mower, of arms pivotally connected therewith, and extending over and being normally supported upon portions of the mower at a distance from its pivotal connection with the said arms, said arms being adapted to swing on their pivotal connections from one side of a perpendicular position to the other; and a grass-box pivotally suspended from said arms above the center of gravity of said box, substantially as described.

2. The combination with a lawn-mower, of arms pivotally connected therewith, and extending over and being normally supported upon portions of the mower at a distance from its pivotal connection with the said arms, said arms being adapted to swing on their pivotal connections from one side of a perpendicular position to the other; a grass-box pivotally suspended from said arms above the center of gravity of said box, and means for limiting the movement of said box with respect to the bail, whereby said box may be swung entirely over the mower before being dumped, substantially as described.

3. The combination with a lawn-mower provided with side frames, of a bail pivotally connected to said mower, a bail-supporting device secured to said side frames and engaging the bail at a distance from the pivotal connection of the bail with the mower, said bail being adapted to swing on its pivotal connections from one side of a perpendicular position to the other; a grass-box pivotally suspended from said bail above the center of gravity of said box and a stop for limiting the movement of the grass-box with respect to the bail, whereby the said box may be swung entirely over the mower before being dumped, substantially as described.

4. The combination with a lawn-mower provided with side frames, of a bail pivotally connected to said mower, a bail-supporting device secured to said side frames and engaging the bail at a distance from the pivotal connection of the bail with the mower, a grass-box pivoted to said bail above the center of gravity of said box, lugs on said box at a distance from its pivots for engaging the bail, when the latter is in its normal position, and a stop for limiting the movement of the box with respect to the bail, substantially as described.

5. The combination with a lawn-mower, of an extension-frame secured to the side frames of the mower, a bail pivotally connected to the mower and adapted to rest upon said extension-frame when in its forward position, a grass-box pivoted to the said bail above its center of gravity and provided with supporting-lugs forward of its pivots for engaging said extension-frame, supporting-lugs in rear of its pivots in position to engage the bail and a stop on said grass-box below its pivots for engaging the bail to limit the movement of said grass-box upon its pivot, substantially as described.

6. An attachment for a lawn-mower comprising a bail, provided with means for pivotally connecting it to a lawn-mower, so that it may be swung from one side of a perpendicular position to the other, a grass-box pivotally suspended from said bail above the center of gravity of said box, and a stop on said box for engaging the bail to limit the movement of the box with respect to the bail, substantially as described.

7. An attachment for a lawn-mower comprising a bail provided with means for pivotally connecting it to a lawn-mower, a grass-box pivoted to said bail above the center of gravity of said box, projections on said box at a distance from said pivots for engaging the bail on one side to support the box in a horizontal position, and a stop on the box below the said pivots for engaging the bail on the other side to limit the movement of the box with respect to the bail, substantially as described.

In testimony whereof I affix my signature in the presence of two witnesses.

THOMAS COLDWELL.

Witnesses:
  WILLIAM J. WYGANT,
  REUBEN H. HILTON.